(12) United States Patent
Meynen et al.

(10) Patent No.: US 11,654,643 B2
(45) Date of Patent: May 23, 2023

(54) METHOD FOR MANUFACTURING AN OPTICAL ARTICLE

(71) Applicant: Essilor International, Charenton-le-Pont (FR)

(72) Inventors: Mathieu Meynen, Charenton-le-Pont (FR); Ludovic Jouard, Charenton-le-Pont (FR); Marc Reignault, Charenton-le-Pont (FR); Sira Uhalte Nogues, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 130 days.

(21) Appl. No.: 16/607,541

(22) PCT Filed: Apr. 26, 2018

(86) PCT No.: PCT/EP2018/060701
§ 371 (c)(1),
(2) Date: Oct. 23, 2019

(87) PCT Pub. No.: WO2018/197606
PCT Pub. Date: Nov. 1, 2018

(65) Prior Publication Data
US 2020/0070452 A1 Mar. 5, 2020

(30) Foreign Application Priority Data
Apr. 26, 2017 (EP) .................................. 17305465

(51) Int. Cl.
*B29D 11/00* (2006.01)
*B32B 37/10* (2006.01)
(Continued)

(52) U.S. Cl.
CPC .... *B29D 11/00403* (2013.01); *B29D 11/0073* (2013.01); *B32B 37/1009* (2013.01);
(Continued)

(58) Field of Classification Search
CPC ............ B32B 37/1009; B32B 37/1018; B29D 11/00403
(Continued)

(56) References Cited

U.S. PATENT DOCUMENTS 5,851,328 A 12/1998 Kohan
5,858,163 A 1/1999 Wood et al.
(Continued)

FOREIGN PATENT DOCUMENTS

DE 33 46 785 A1 6/1984
GB 2 253 917 A 9/1992

OTHER PUBLICATIONS

International Search Report dated Jul. 11, 2018 in PCT/EP2018/060701 filed on Apr. 26, 2018.
(Continued)

*Primary Examiner* — Philip C Tucker
*Assistant Examiner* — John Blades
(74) *Attorney, Agent, or Firm* — Oblon, McClelland, Maier & Neustadt, L.L.P.

(57) ABSTRACT

A method for manufacturing an optical article including the following steps: a. providing a first substrate with a main surface, b. depositing a second substrate on the main surface with an adhesive layer so that the space between the first substrate and second substrate is filled by the adhesive layer, c. curing the adhesive layer to induce a polymerization of the adhesive layer, wherein a tension step takes place after steps a. and b., and before step c., the tension step including applying symmetrically a tension, preferentially with a central symmetry, preferentially a radial isotropic tension or an ortho-distributed symmetrical tension, on the edges of the second substrate sensibly in a tension plan parallel to a plan representative of the main surface.

12 Claims, 1 Drawing Sheet

Figure 1:
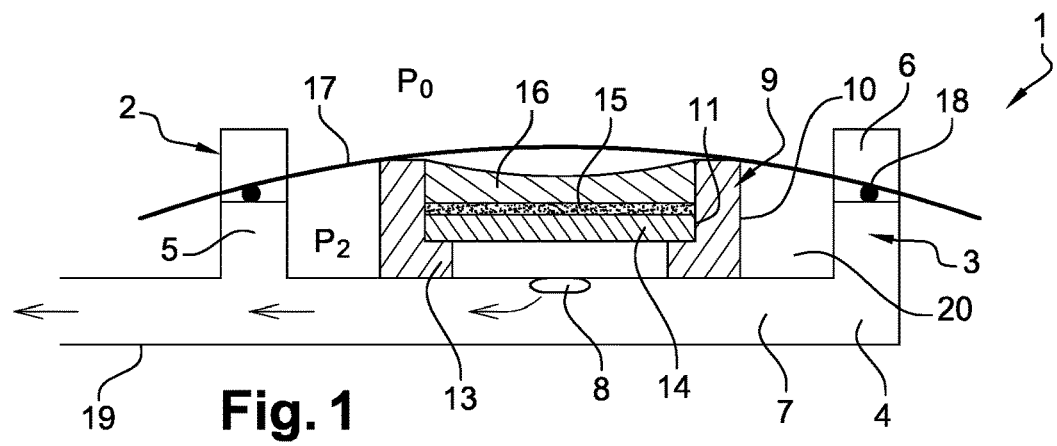

(51) Int. Cl.
  *B32B 37/12* (2006.01)
  *B32B 37/14* (2006.01)
  *B32B 38/00* (2006.01)

(52) U.S. Cl.
  CPC .......... *B32B 37/1018* (2013.01); *B32B 37/12* (2013.01); *B32B 37/1292* (2013.01); *B32B 37/144* (2013.01); *B32B 38/1875* (2013.01); *B32B 2037/1253* (2013.01); *B32B 2551/00* (2013.01)

(58) Field of Classification Search
  USPC .................................................. 156/285, 382
  See application file for complete search history.

(56) References Cited

U.S. PATENT DOCUMENTS

| | | | |
|---|---|---|---|
| 6,051,091 A | 4/2000 | Wood et al. | |
| 6,106,665 A | 8/2000 | Wood et al. | |
| 6,638,583 B1 | 10/2003 | Sharp et al. | |
| 8,980,025 B2* | 3/2015 | Van Den Brand | B32B 37/10 156/64 |
| 2007/0195422 A1 | 8/2007 | Begon et al. | |
| 2015/0241714 A1 | 8/2015 | Allione et al. | |
| 2017/0100903 A1* | 4/2017 | Rodriguez | B29D 11/00009 |

OTHER PUBLICATIONS

Extended European Search Report dated Oct. 9, 2017 in European Application 17305465, filed on Apr. 26, 2017.

* cited by examiner

METHOD FOR MANUFACTURING AN OPTICAL ARTICLE

The invention relates to a method for manufacturing an optical article.

More precisely, the technical domain of the invention concerns the active systems and more specifically the informative systems. A method pursuant to the invention is particularly but not exclusively useful in the framework of electrochromic.

In order to change the optical properties of an optical element, it may happen that it appears necessary to bond an additional optical element made in organic material to another optical element, more rigid, such as made in mineral material. As an example, informative products are deprived of RX (optical prescription/power adapted to a wearer), and it could be suitable to bring said RX through an optical element made in organic material, which is intended to be bonded to said informative element.

But, a problem generally encountered with such bonding methods is that the optical organic element presents often some level of deformation which makes difficult its use by gravity bonding from a point of view of the optical conformity. Indeed, the deformation of the additional optical organic element leads to loss of accuracy of the optical power that is desired to be brought onto the rigid optical element by the additional optical element.

Currently, other bonding methods already exist to bond an organic optical element to a mineral optical element, but the glue which is used in such methods are rigid. Consequently, these methods are not satisfactory, because they do not allow having a good homogeneity of the load exerted on the whole glass surface. The loads distribution will depend on the glass surface state, like for example its concavity, and/or on its shape which can generate more or less edge effects. This lack of loads homogeneity may conduct to a non-homogenous wafer deformation.

Moreover, the loads necessary to perform a bonding by tampon or by deformable membrane are generally quite important, which leads to the following difficulties:
  Very thin wafers are easily deformed with only weak loads, and thus it is difficult to master their deformation levels with the tampons/membranes, particularly if the glue which is used is liquid,
  The receptor optical element, which can be for example a LOE (Light Optical Element) or electrochromic cells, can be itself fragile and damaged if the loads are too important (in the case of electrochromic cells assembly), or be deformed if said receptor optical element is not rigid enough (in the case of a thin wafer), A method pursuant to the invention allows to fix together a first and a second optical element by avoiding the disadvantages found in the existing methods.

An object of the invention is a method for manufacturing an optical article comprising the following steps:
  a. Providing a first substrate with a main surface,
  b. Depositing a second substrate on said main surface by means of an adhesive layer so that the space between the first substrate and second substrate is filled by said adhesive layer,
  c. Curing the adhesive layer to induce a polymerization of the adhesive layer, Wherein a tension step takes place after steps a and b, and before step c, said tension step consisting in applying symmetrically a tension, on the edges of the second substrate sensibly in a tension plane parallel to a plane representative of the main surface, so as to homogeneously and strongly plate the second substrate on the first substrate, and to obtain a second substrate which tends to be rigorously parallel to the first substrate without introducing too important surface heterogeneities on the resulting assembly comprising said first and second substrates.

The tension step aims to correct untimely deformations which could appear during steps a and b, like for example second substrate shifting or curling. This supplementary step allows to homogeneously and strongly plate the second substrate on the first substrate so as to obtain a second substrate which tends to be rigorously parallel to the first substrate without introducing too important surface heterogeneities on the resulting assembly comprising said first and second substrates. The tension step can be realized with all kind of suitable means, like for example a stretching film or a piston applied on one surface of the second substrate, or by fixing springs or other means to the edges of the second substrate. Advantageously, the adhesive layer may comprise a liquid glue. In an embodiment, the adhesive layer is spread on the whole interface between the first and the second substrates. As an example, the first substrate may be made of an organic material and the second substrate may be made of a mineral material. In the case where the second substrate would have an unwanted curl or shift, the step of applying a tension on the edges of said second substrate could lead to a deformation of the second substrate so as to reduce the height differences of the resulting assembly, similar to straightening out the second substrate.

In the following definitions, the wording "horizontal tension" defines the part of an applied tension that is in a tension plane, called horizontal plane, parallel to a plane representative of the main surface of the first substrate.

By a symmetric tension, it is understood that the horizontal tension is applied globally in a symmetric way; for example, one can find a plane of symmetry going through the substrate for which the balance of the horizontal tension applied on the edges of the second substrate on one side of the plane is equal to the balance of the horizontal tension applied on the edges of the second substrate on the other side of the plane. In a particular case, the horizontal tension applied along a first direction of the horizontal plane is much greater that the tension applied along another direction of the horizontal plane perpendicular to the first direction.

Advantageously, the tension is to be chosen among a tension with a central symmetry, a radial isotropic tension and an orthogonally distributed symmetrical tension.

By a central symmetric tension, it is understood that one can find a multitude of plane of symmetry as above and that those planes of symmetry cross each other's with the horizontal plane on a same point, called centre of symmetry. Further, in the case of a central symmetric tension, the average horizontal tension applied to any given angular sector is equivalent and opposite to the average horizontal tension applied to an angular sector positioned in opposition with regard to the symmetric centre of symmetry.

By a radial isotropic tension, it is understood that it is a central symmetric tension in which the horizontal tension applied on each point is sensibly identical, for example plus or minus 10%.

By an ortho-distributed symmetrical tension it is understood that the tension is locally applied in a plane orthogonal to a local tangent to the edge of the second substrate. Preferably, in such case, the horizontal tension is sensibly identical on every point of the edge. Preferably it is however organised in a symmetric way such that for any direction of the horizontal plane there is a orthogonal plane to said direction for which the balance of the horizontal tensions on one side of the plane is symmetrical to the balance of the horizontal tensions on the other side.

Preferentially, the tension is applied only at the edges of the second substrate.

Advantageously, the step consisting in applying symmetrically a tension on the edges of the second substrate sensibly in a tension pane parallel to a plan representative of the main surface, tends to spread said second substrate on the first substrate.

In an embodiment, the first substrate is in mineral glass and the second substrate is in organic glass.

Advantageously, the main surface of the first substrate is planar. In another embodiment, the main surface of the first substrate has a homogeneous curvature. In that other embodiment, at least one surface of the second substrate is therefore with a curvature complementary to the one of the main surface of the first substrate so as to be sensibly matching it when put said two surfaces are brought into contact, separated only by a layer of liquid glue.

In an embodiment, the symmetric tension is applied both before the curing step and during at least part of the curing step. In order to be fully efficient, the symmetric tension must begin before the curing step and must be extended during a period of said curing step, Advantageously, the symmetric tension is such that the axial component of the tension load present in the tension plane is at least 3 times greater, preferentially 5 times, for example more than 10 times, than any axial component according to the normal to said tension plane. Said otherwise, the local horizontal tension is 3 times, 5 times or even more than 10 times greater than other component of the local tension. With such a configuration, the tension load applied along the interface between the first and the second substrates is much more important than the one applied normally to said interface, which enables to maximise the effect of straightening the second substrate.

In an embodiment, the deposition step comprises the following steps:
  d. applying a photocurable adhesive to the main surface of the first substrate,
  e. joining the adhesive of the main surface with a main surface of the second substrate horizontally such that the second substrate is above the first substrate;
  f. allowing the adhesive to spread along the interface between said first and second substrates under the weight of the second substrate until the adhesive fills the space between the first substrate and the second substrate.

In such a manner, it is not necessary that the initial adhesive layer extends along the whole surface of the interface between the first and second substrates, since the weight of the second substrate will facilitate said adhesive layer to spread along said whole surface. Such a method allows the adhesive layer to be homogenized between the two substrates, and thus it appears not necessary to deposit the adhesive layer with a great accuracy.

Advantageously, the second substrate have a first main face, which is predetermined to be in contact with the adhesive, and a second main surface, the second main surface of the second substrate being fixed to a polymeric film which is larger than said second main surface, the tension step being applied by means of said polymeric film to the edge situated of the second main surface of the second substrate. In an embodiment, the second main surface is opposite to the first main surface and extends in a direction sensibly parallel to said first main surface. By exerting a tension load on the film in a direction which is sensibly parallel to the plane of said film, the second substrate can react in the way that its second main surface becomes homogeneous by flattening. The film advantageously covers entirely the second face of the second substrate by remaining at least partially in contact with said second face. In an embodiment, the film is flexible and closely fit with the surface of the second face of the second substrate. In another embodiment, the film is of annular shape and covers only the second substrate edges, possibly covering the surface on a few millimeters, because it appears not necessary (but also recommended) that it covers the whole surface of the second substrate.

In an embodiment, the film is extendable during the tension step. In such a way, by being deformable, the film is particularly adapted to apply the suitable load on the edges of the second substrate so as said second substrate remains closely in contact with the first substrate. Such a film tends to fold the edges of the second substrate in order to flatten the surface plane of the second surface of the second substrate.

Advantageously, the film is a cling film or a plastic wrap. In such a configuration, after a transient period during which the cling film can shift a bit, the film clings to the edges and does not slide on the second surface of the second substrate, hereafter it is capable of applying the suitable tension on said second substrate. Indeed, while first applying the tension to the cling film, the cling film comes closer to the second substrate and can slide a bit on it; however, once the applied tension overcomes a plastic deformation threshold of the cling film, said film sticks to the edges of the second substrate. Using a cling film, the applied tension is often an ortho-distributed symmetrical tension. The local value of the tension may vary depending on the local height of the edge of the second substrate and a distance between the edge and the edges of the recess.

In an embodiment, the tension step is realized by applying a pressure which is different from the atmospheric pressure, between a face of the polymeric film fixed to the second substrate and an opposite face of the polymeric film which is not fixed to said second substrate, one of these faces cooperating with an external wall to form a tight-sealed chamber. In an embodiment, the film is fixed to the external wall, and said wall encloses the first and second substrates. By means of applying a pressure, which can be higher or lower than the atmospheric pressure, the film reacts by being deformed so as to apply a tensile load on the second substrate. When a method pursuant to the invention is implemented in tight-sealed chamber, the conditions of the film pressurization are well controlled. The chamber can be for example of cylindrical or rectangular shape.

Advantageously, during the tension step, the first substrate and the second substrate are in the tight sealed chamber, and a negative pressure is applied in said chamber. A negative pressure produced in the tight-sealed chamber leads to a better interaction between the film and the second substrate, than the interaction obtained by a positive pressure.

In an embodiment, said negative pressure is comprised between 0.05 bar and 1 bar, preferentially between 0.05 bar and 0.3 bar.

Advantageously, during the depositing step the first substrate is deposited in a support which comprises a recess delimited by a wall for receiving the first substrate and arranged so that the edges of said wall protrudes at a first height, the first height being greater than a height of the first substrate once placed in the recess, and being comparable to a cumulative height of the first substrate, the adhesive and the second substrate, the film covering the second substrate.

This way, since the film is intended to be in contact with an extremity of the wall delimiting the recess and corresponding to the first height, there will not be a too big difference of height for the film, between the second substrate on which it is fixed, and said first height. In such a configuration, the film is correctly placed in the spaced to exert a tensile load on the second substrate In an embodiment, the first height being comparable to said cumulative height to within 1 mm, preferentially to within 0.5 mm.

Another object of the invention is an apparatus for manufacturing an article, comprising a support for receiving a first substrate, and a tensioner for applying a symmetric tension, preferably a radial isotropic tension, on a second substrate deposited on the first substrate.

Advantageously, the tensioner comprises a chamber for receiving the support, a sealing ring cooperating with an opening of said chamber for sealing a film in between the sealing ring and the edges of said opening so as to form an air-tight chamber, and a suction pump for applying a suction said airtight chamber.

A method pursuant to the invention presents the advantage of being simple, and rapid to be implemented, because it involves a reduced number of pieces, which the arrangement is rather compact and which the operating conditions are well controlled. Moreover, it has the advantage of being particularly efficient by means of a simple light film, which is a light material easy to handle. Finally, due to the reduced number of pieces involved in such a method and their nature such a method is cheap.

Figure 2:
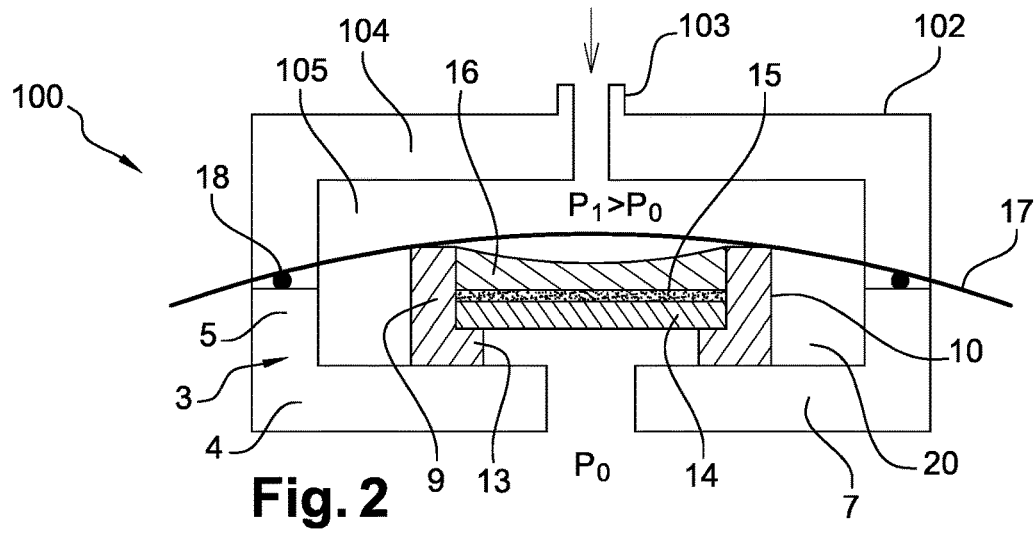
Figure 3:
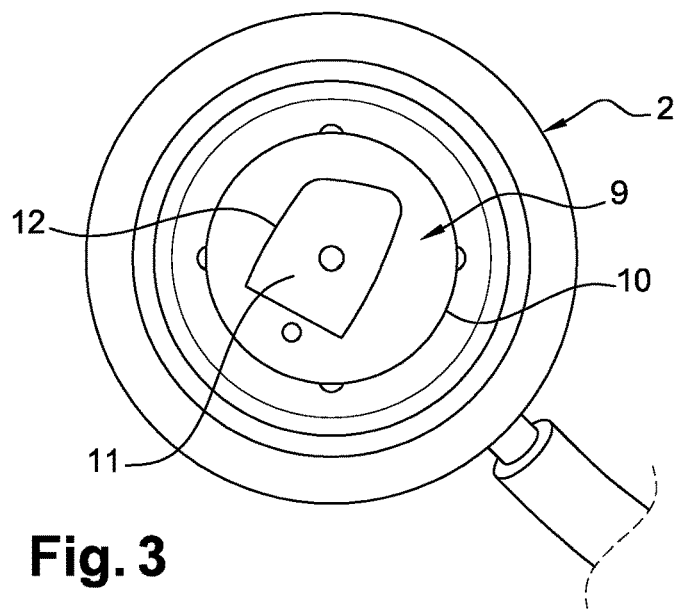

We give hereafter a detailed description of two preferred embodiments of a method and apparatus pursuant to the invention, by referring to the following figures:

FIG. 1 is an axial sectional view of a first preferred embodiment of an apparatus pursuant to the invention, FIG. 2 is an axial sectional view of a second preferred embodiment of an apparatus pursuant to the invention, FIG. 3 is a top view of the apparatus described in FIG. 1.

Referring to FIG. 1, a first preferred embodiment of an apparatus 1 pursuant to the invention comprises a chamber 2 delimited by a cylindric wall 3 having a constant internal diameter and having a constant thickness. Preferentially, the wall is made of a polymeric material. It is to be noted that the chamber 2 might also be in metal, for example aluminum.

The wall 3 of the chamber 2 comprises two parts, one first main part 4 which can be assimilated to a mounting base and which comprises an external part 5 of cylindrical shape, and one second part 6 which can be assimilated to a cover and which is also of cylindrical shape. The second part 6 which is preferentially made of the same material than the one of the first part 4, can have the same internal diameter and the same thickness than those of the external part 5 of said first part 4, but it is not absolutely necessary. This way, when the second part 6 is placed on the cylindrical part 5, they define together a continuous resulting cylindrical wall 3. The first main part 4 also comprises a solid circular plane wall 7 having a center aperture 8 in such way that the external cylindrical part 5 constitutes a peripheral edge of said circular plane wall 7. The main part 4 including the external cylindrical part 5 and the full circular plane an wall 7 is made one piece.

Referring to FIGS. 1 and 3, a support 9 made of the same material than the one of the different walls 4, 5, 6, 7 delimiting the chamber 2, is placed inside the chamber 2 in a concentric manner with said chamber 2. More precisely, the support 9 has a cylindrical contour 10 and is placed inside the chamber 2 in a coaxial manner with respect to said chamber 2. The support 9 presents a recess 11 which the size and the shape depend on the sample which is intended to be treated by the present apparatus 1. Such a recess may have for example the form of an optic glass intended to be mounted on a frame. The recess 11 is thus limited by an external wall of the support 9 having a circular external contour 10 and an internal contour 12 adapted to the contour of the sample to be treated. It is of course not excluded that the internal contour 12 could be also of circular shape. The support 9 is extended by an internal edge 13 which extends radially relatively to the external wall of the support 9 so as to reduce the transversal section of the recess 11, said internal edge 13 acting as an abutment for a sample which would be placed inside the recess 11.

Referring to FIG. 1, the support 9 is placed centrally inside the chamber 2 so that it lies on its internal edge 13.

A sample to be treated by the first preferred embodiment of an apparatus 1 pursuant to the invention is for example a mineral LOE (Light Optical Element) on which an organic wafer is intended to be deposed in order to change its optical properties. As an example, informative products are deprived of RX (optical prescription/power adapted to a wearer), and it could be suitable to bring said RX through an optical element made in organic material, which is intended to be bonded to said informative element.

Schematically, the mineral LOE 14 is deposited at the bottom of the recess 11 of the support 9, said mineral LOE 14 having a concave shape and presenting an upper side and a lower side. An adhesive layer 15 is then deposited partially on the upper side of the LOE 14. The organic wafer 16 is placed on the upper side of the LOE 14 so as to be bonded to said LOE through the adhesive layer 15. Advantageously, an adhesive layer 15 is also deposited partially on a side of the organic wafer 16, said adhesive layer being intended to be in contact with the adhesive layer 15 deposited on the mineral LOE 14, to prevent bubbles creation. Under the weight of the organic wafer 16 the adhesive layer 15 spreads along the whole interface between the organic wafer 16 and the LOE. The external wall delimiting the recess 11 is sized so that the edges of said wall protrudes at a first height, the first height being greater than a height of the mineral LOE 14 once placed in the recess 11, and being comparable to a cumulative height of said LOE 14, the adhesive layer 15 and the organic wafer 16. It is advantageously supposed that the sizes of the LOE 14 and the organic wafer 16 are identical. But it can also be supposed that the sizes of the organic wafer 16 are slightly lower than the one of the LOE 14. It can be assumed that the adhesive layer 15 is previously deposited on a face of the LOE 14 or on a face of the organic wafer 16, or on both faces. Preferentially, the adhesive layer 15 is made of droplet or liquid glue It is to be noted that the adhesive 15 may be dispensed on either of the two substrates 14, 16, and for example can be present on both the main surface of the first substrate 14 and on the main surface of the second substrate 16 that is destined to be matched over the main surface of the first substrate 14. The adhesive layer 15 may further be a droplet of adhesive. In one embodiment, one droplet of adhesive is deposited on each of the main surface of the second substrate 16 and the main surface of the first substrate 14. When the second substrate 16 is applied on the first substrate 14 the two droplets above make contact with each other, thus enabling to lower the risk of creating bubbles.

A polymeric film 17, which is advantageously a cling film or a plastic wrap, is arranged in the chamber 2 so that it is inserted between the two parts 4, 6 of the wall 3 delimiting said chamber 2, and so that it covers an upper extremity of the external wall delimiting the recess 11. This way, said polymeric film 17 tends to cover the organic wafer 16, by being at least partially in contact with an upper side of said organic wafer 16. A sealing ring 18 is advantageously inserted between the two parts 4, 6 of the wall 3 delimiting the chamber 2 in order to isolate from the exterior atmosphere, the free space of the chamber 2 delimited by said film 17 and the wall 3, in which the support 9 comprising the LOE 14, the adhesive layer 15 and the organic wafer 16 are placed. The polymeric film thickness is typically less than 100 μm, and is preferentially comprised between 50 μm and 10 μm.

A suction pump (not shown on the figures) is connected via a duct 19 to the aperture 8 of the solid circular plane wall 7 of the first main part 4. This way, when said pump is triggered, it creates a negative pressure P2 in the free space 20 enclosing the support 9. It is of course supposed that said negative pressure P2 is lower than the atmospheric pressure Po. Consequently, the film 17 is deformed and tends to be pressed against an upper side of the organic wafer 16. The film thus exerts a symmetric tension so as the axial component of the tension load present in the tension plan of the film 17 is at least 3 times greater, preferentially 5 times, for example more than 10 times, than any axial component according to the normal to said tension plan. The result produced by such a film 17 is that it tends to homogeneously and strongly plate the organic wafer 16 against the mineral LOE 14 so as to obtain an organic wafer 16 which tends to be rigorously parallel to the mineral LOE 14 without introducing too important surface heterogeneities on the resulting assembly comprising said mineral LOE 14 and the organic wafer 16. In other words, the presence of the polymeric film 17 aims to correct untimely deformations which could appear like for example second substrate shifting or curling.

Hence, a method for manufacturing an optical article from the first preferred embodiment of the apparatus 1 above disclosed, comprises the following main steps:

Placing the LOE 14 in the bottom of the recess 11 created in the support 9, said support 9 being already placed in the chamber 2, Depositing the organic wafer 16 on said LOE 14 by means of an adhesive layer 15 so that the space between said LOE 14 and said organic wafer 16 is filled by said adhesive layer 15. This adhesive layer 15 can be initially deposited so as to extend along the whole interface between these two elements 14, 16, or only on a part of said interface. In the last case, the weight of the organic wafer 16 will facilitate the spreading of the adhesive layer 15 along the whole interface. Once the organic wafer 16 is placed on the LOE 14, it is fully included in the recess 11. But it is not excluded that it slightly protrudes from it, the emergent part of said organic wafer 16 remaining lower than 100% of its total height, preferably lower than 50% of its height, preferably lower than 20% of its height, preferably lower than 1 mm or even lower than 500 μm. Conversely, if the organic wafer 16 is fully included in the recess 11, it is preferable than the recess 11 does not protrude more than 2 mm, preferably not more than 1 mm, preferably not more than 500 μm from the height of the edges of the organic wafer 16.

Fixing the polymeric film 17 in the chamber 2 between the two parts 4, 6 of the peripheral wall 3 of said chamber 2, so that it covers the organic wafer 16 previously deposited on the LOE 14. In the case that the organic wafer 16 does not protrude from the recess 11, the polymeric film 17 is in contact with one end of the external wall delimiting the recess 11.

Applying a negative pressure P2 in the chamber 2 by means of the suction pump, in the free space 20 delimited by the film 17 and the first part 4 of the wall 3 of the chamber 2, and in which the support 9 is placed. Under the negative pressure effect, the polymeric film 17 is sucked and deformed. It is thus platted against the organic wafer 16, by applying a radial isotropic tension on the edges of said organic wafer 16 sensibly in a tension plane parallel to a plane representative of the upper face of the organic wafer 16. Before applying the negative pressure P2, the film 17 is, or is not, in contact with the organic wafer 16.

Curing the adhesive layer 15 to induce a polymerization of the adhesive layer 15, during the step of applying a negative pressure in the chamber 2. By means of a film 17 under pressure, the organic wafer 16 tends to be rigorously parallel to the LOE 14, said film 17 contributing to correct untimely deformations which could appear during the first steps of the method, like for example organic wafer 16 shifting or curling.

The previous stages do not necessarily appear in the order in which they have been listed above. Indeed, the adhesive can be previously deposited on at least one substrate 14, 16 before placing the LOE 14 in the bottom of the recess 11 created in the support 9. It is also to be noted that the LOE 14 and the organic wafer 16 can be assembled together by means of the adhesive 15 before positioning the LOE 14 inside the support 9.

Referring to FIG. 2, a second preferred embodiment of an apparatus 100 pursuant to the invention differs from the first preferred embodiment above described, on the nature of the pressure produced in the chamber 102. Indeed, instead of creating a negative pressure inside the space 20 delimited by the film 17 and the wall 3 of the chamber 102 and in which the support 9 is placed, an overpressure P1 is applied on the film 17, more specifically on a side of said film 17 which is external to the space 20 where the support 9 is placed. It is of course supposed that said overpressure is higher than the atmospheric Po pressure. For this purpose, an air inlay 103 is created on an upper rigid wall 104 of the chamber 102 in an upper space 105 which is located above the space 20 enclosing the support 9, said spaces 20, 105, being separated by the polymeric film 17. This way a pushing force is exerted on the film 17 which reacts by being deformed and by being platted against the organic wafer 16. The function and the effects produced by the polymeric film 17 in this preferred embodiment 100, are quite the same than those produced in the first preferred embodiment 1 above disclosed.

The two preferred embodiments 1, 100 above disclosed represent two equivalent alternatives of an apparatus pursuant to the invention. The pressure levels used in these two examples, as an overpressure or a negative pressure, are typically between 0.05 bar and 1 bar, preferentially 0.05 bar and 0.3 bar.

Preferentially, the polymeric film 17 is used one shot and is changed before treating another sample.

The invention claimed is:

1. A method for manufacturing an optical article comprising:
   providing a first substrate with a main surface;
   depositing a second substrate on said main surface with an adhesive layer so that a space between the first substrate and second substrate is filled by said adhesive layer; and curing the adhesive layer to induce a polymerization of the adhesive layer, wherein a tension step takes place after the providing and the depositing, and before the curing, said tension step comprising applying symmetrically a tension to a polymeric film, on edges of the second substrate in a tension plane parallel to a plane of the main surface, to homogeneously place the second substrate on the first substrate, and to obtain the second substrate which is rigorously parallel to the first substrate without introducing surface heterogeneities on a resulting assembly comprising said first and second substrates, the second substrate has a first main face, which is predetermined to be in contact with the adhesive layer and a second main surface, the second main surface of the second substrate is fixed to the polymeric film which is larger than said second main surface, and the tension step is applied by said polymeric film to edges situated on the second main surface of the second substrate, the film being extendable during the tension step, said film being a cling film.

2. The method according to claim 1, wherein the tension is one of a tension with a central symmetry, a radial isotropic tension, and an orthogonally distributed symmetrical tension.

3. The method according to claim 1, wherein
the first substrate is mineral glass, and
the second substrate is organic glass.

4. The method according to claim 1, wherein the main surface of the first substrate is planar.

5. The method according to claim 1, wherein the symmetric tension is applied both before the curing step and during at least part of the curing step.

6. The method according to claim 1, wherein the symmetric tension is such that a local horizontal tension is at least 3 times greater than other components of local tension.

7. The method according to claim 1, wherein the depositing further comprises:
applying a photocurable adhesive to the main surface of the first substrate;
joining with the second substrate horizontally such that the second substrate is above the first substrate; and
allowing the adhesive to spread along an interface between said first and second substrates under a weight of the second substrate until the adhesive fills the space between the first substrate and the second substrate.

8. The method according to claim 1, wherein the tension step further comprises applying a pressure which is different from an atmospheric pressure, between a face of the polymeric film fixed to the second substrate and an opposite face of the polymeric film which is not fixed to said second substrate, one of these faces cooperating with an external wall to form a tight-sealed chamber.

9. The method according to claim 8, wherein during the tension step, the first substrate and the second substrate are in the tight-sealed chamber, and a negative pressure is applied in said chamber.

10. The method according to claim 9, wherein said negative pressure is comprised between 0.05 bar and 1 bar.

11. The method according to claim 1, wherein
during the depositing the first substrate is deposited in a support which comprises a recess delimited by a wall for receiving said first substrate, and arranged so that a surface of said wall protrudes at a first height,
the first height is greater than a height of the first substrate once placed in the recess, and is comparable to a cumulative height of the first substrate, the adhesive layer, and the second substrate, and
the film covers the second substrate.

12. The method according to claim 11, wherein the first height is comparable to said cumulative height to within 1 mm.

* * * * *